United States Patent Office 3,497,495
Patented Feb. 24, 1970

---

3,497,495
WATER INSOLUBLE MONOAZO DYESTUFFS
Duncan G. Carmichael, Gastonia, N.C., assignor to Martin Marietta Corporation, a corporation of Maryland
No Drawing. Filed Sept. 1, 1967, Ser. No. 664,916
Int. Cl. C09b *29/08;* C07c *107/06*
U.S. Cl. 260—207.1             4 Claims

---

ABSTRACT OF THE DISCLOSURE

There are disclosed herein water insoluble monoazo dyestuffs of the general formula

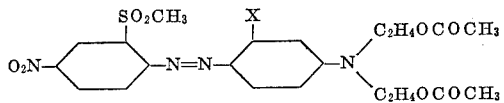

and method for making same comprising the step of coupling equimolar amounts of diazotized 1-amino-4-nitrobenzene-2-methylsulfone and

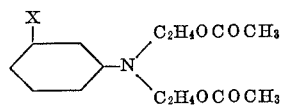

wherein X is Cl, Br or $CH_3$. Use of the dyes for dyeing synthetic linear polyester textile fibers, such as polyethylene terephthalate, in red range shades of outstanding fastness is also disclosed.

---

The present invention relates to dyestuffs, and more particularly to water insoluble monoazo dyestuffs and method for making same.

The dyestuffs of the present invention are particularly characterized in that they have the general formula

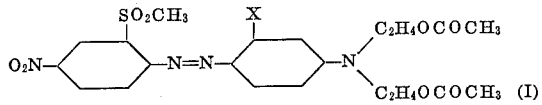

wherein X is Cl, Br or $CH_3$.

Generally speaking, the method of the present invention is a method for preparing a water insoluble monoazo dyestuff of the above Formula I comprising the step of coupling equimolar amounts of diazotized 1-amino-4-nitrobenzene-2-methylsulfone and

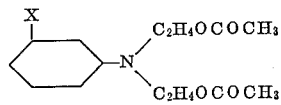

wherein X is Cl, Br or $CH_3$.

The dyestuffs of the present invention are particularly suitable for dyeing synthetic linear polyester textile fibers, such as polyethylene terephthalate, in red range shades of outstanding fastness properties by the known thermosol and carrier dyeing methods. In addition, the dyes of the present invention may be applied to polyamide and secondary cellulose acetate textile fibers. The dyes of Examples 1 and 3 below are also suitable for pigment dyeing of polystyrene film.

In recent years, very large amounts of synthetic linear polyester textile fibers have been blended with cotton fibers, and formed into fabric, the fabric dyed and then subjected to permanent press resin finish treatment, by processes which involve resinating the dyed fabric and delaying completely curing or polymerizing the resin precondensate until after garments have been fabricated and creased. That process (U.S. Patent No. 2,974,432) is commonly known as permanent press finishing. Permanent press finishing very often degrades the light, wash, sublimation and other fastness properties of dyes on the linear polyester fibers, and this degradation is often so severe that many otherwise good dyes for linear polyester fibers may not be used satisfactorily on goods which are to be subjected to permanent press finishing.

U.S. Patent No. 2,082,156 disclosed generally the dyestuff of the formula

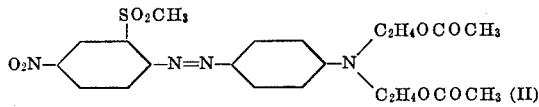

for dyeing acetate artificial silk. I have found that one important difficulty with this red dye of Formula II for dyeing synthetic linear polyester textile fibers is that when it is applied thereto by the conventional long bath carrier method it will not build up to heavy shades, which is to say that it has poor shade building properties or less than desirable affinity for synthetic linear polyester textile fibers when applied by the commonly used long bath carrier dyeing method. Other important difficulties are that when the dye of Formula II is applied to cotton/synthetic linear polyester blends and the dyeing subjected to permanent press finishing with dimethylol dihydroxy ethylene urea resin, the light fastness and wash fastness of the dye are substantially impaired.

British patent specification 1,047,229 discloses generally the dye of the formula

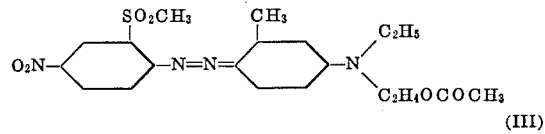

for use on linear polyester materials. The primary difficulty with this Bordeaux (somewhat violet) dye is that it has less than desirable light fastness when applied to blended cotton/synthetic linear polyester textile fabric and the dyeing subjected to permanent press finishing with dimethylol dihydroxy ethylene urea resin.

Although there are a number of red dyes for synthetic linear polyester textile fibers present on the market, all of them with which I am familiar are deficient in one or more desirable properties.

According to the present invention, the above disadvantages and limitations of the prior art have been overcome, and additional advantages have been provided as follows.

The dyes of the present invention are particularly suitable for dyeing synthetic linear polyester textile fibers, including dyeing the polyester portion of cotton/polyester blends which may optionally be after-treated by permanent press finishing. The fastness properties of the dyes of the present invention are outstanding, as shown in detail hereinafter. Moreover, they have good to very good shade building power from light to heavy shades when applied by the long bath carrier dyeing method. Moreover, the dyestuff of Example 1 below is the best all around red dye for synthetic linear polyester textile fibers with which I am familiar.

The following is a more detailed description for preparing the dyes of the present invention. All parts herein are by weight unless otherwise specified.

1-amino-4-nitrobenzene-2-methylsulfone (Chem. Ab., 27:4685[2]) may be diazotized with nitrosylsulfuric acid (U.S. Patent 2,118,661) and acetic acid.

Nitrosylsulfuric acid may be prepared by adding 1 part $NaNO_2$ to 10 parts 96% $H_2SO_4$, heating at about 70–85° C. for about 10 minutes, and cooling to 15°–18° C.

The diazotization step may be conducted by adding 4.8 parts glacial acetic acid at 15°–18° C. to 6 parts nitrosylsulfuric acid at 15°–18° C., and adding 1 part 1-amino-4-nitrobenzene-2-methylsulfone thereto at 15°–18° C., and stirring about 3 hours at 0°–20° C., and preferably at 15°–18° C., to produce a solution of diazotized 1-amino-4-nitrobenzene-2-methylsulfone. The diazo may be diluted by adding it at 15°–18° C. to a mixture of 30 parts H₂O and 5 parts ice, following which 0.08 part sulfamic acid may be added to remove excess nitrous acid.

An acetic anhydride solution of

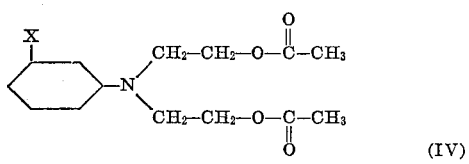

(IV)

may be prepared by heating 1 part acetic anhydride to 113°–115° C., adding 1 part

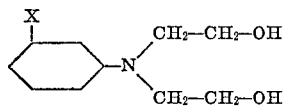

at 113°–115° C., stirring 1 hour at 113°–115° C., and cooling to room temperature, in which X is as above defined.

The coupling reaction may be conducted as follows. To 1 part of the acetic anhydride solution of a compound of Formula IV above at room temperature may be added 1 part H₂O, 2–3 parts 1:5 acid (1 part propionic acid to 5 parts glacial acetic acid), 0.8 part sodium acetate and 0.2 part sodium lignosulfonate dispersing agent, and the composition cooled to about 0°–10° C. The above diazotized and diluted 1-amino-4-nitrobenzene-2-methylsulfone, in equimolar amount to the amount of the compound of Formula IV used, calculated as solids, may be added to the coupling component at about 0°–10° C., gradually over a period of about an hour, simultaneously with addition of about 3–4 parts 30% aqueous sodium acetate, and 3–4 parts 1:5 acid, while the reaction mixture is maintained at about 0°–10° C. The reaction mixture may be stirred at about 0°–10° C. for about 2 hours, following which coupling is complete.

The resulting dyestuff may be recovered by drowning in a large volume of water containing about 1% sodium lignosulfonate, recovering the dyestuff solids by filtration, and washing the solids with water at tap temperature until free of acids. The dyestuff solids may be worked up from the moist presscake or dried at about 40° C. If desired, the dyestuff solids may be recrystallized from an ethanol solution thereof to remove any impurities.

The following are illustrative examples.

EXAMPLE 1

The dyestuff of the formula

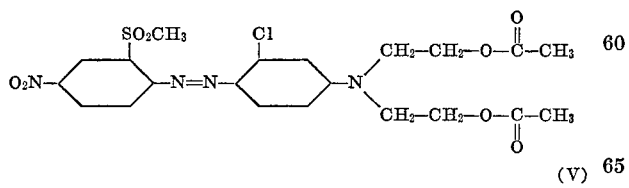

(V)

may be prepared as follows.

1-amino-4-nitrobenzene-2-methylsulfone (Chem. Ab., 27:4685²) is diazotized as follows. Nitrosylsulfuric acid is prepared by adding 4.8 gms. NaNO₂ to 48 ml. 96% H₂SO₄, holding 10 minutes at 70°–80° C. and cooling to 18° C. Sixty ml. glacial acetic acid at 15°–18° C. is added to the nitrosylsulfuric acid, and 13.1 gms. 1-amino-4-nitrobenzene-2-methylsulfone is then added thereto at 15°–18° C., the mixture is stirred 3 hours at 15°–18° C. to produce a solution of diazotized 1-amino-4-nitrobenzene-2-methylsulfone, which is diluted by adding the diazo at 15–18° C. to a mixture of 400 ml. H₂O and 64 gms. ice, following which 1 gm. of sulfamic acid is added to remove excess nitrous acid.

An acetic anhydride solution of N,β,N,β-diacetoxyethyl-m-chloroaniline is prepared as follows. 100 gms. acetic anhydride is heated to 115° C., 100 gms. 2,2′-(m-chlorophenylimino)diethanol (U.S. Patent No. 2,618,613) is added thereto at 113°–115° C., and held with stirring 1 hour at 115° C., followed by cooling to room temperature.

The above components are coupled as follows.

To 35.2 gms. of the acetic anhydride solution of N,β,N,β-diacetoxyethyl-m-chloroaniline are added 40 ml. H₂O, 102 gms. of a mixture of 17 gms. propionic acid and 85 gms. glacial acetic acid, 28 gms. sodium acetate, and 8 gms. sodium lignosulfonate dispersing agent, which is cooled to 5°–10° C. The above diluted solution of diazotized 1-amino-4-nitrobenzene-2-methylsulfone is added thereto gradually during a period of 1 hr., while the reaction mixture is maintained at 5°–10° C. Simultaneously with the addition of the diazo there is added 120 ml. 30% aqueous sodium acetate, and 120 gms. of a mixture of 20 gms. propionic acid and 100 gms. glacial acetic acid. The reaction mixture is stirred at 5°–10° C. for 2 additional hours, following which coupling is complete. The resulting mass is drowned in 1.2 liters H₂O containing 12 gms. sodium lignosulfonate, and the dyestuff solids are recovered by filtration, washed with tap water until free of acids, and dried at 40° C. If desired, the dyestuff may be recrystallized from an ethanol solution thereof to remove any impurities.

EXAMPLE 2

The dyestuff of the formula

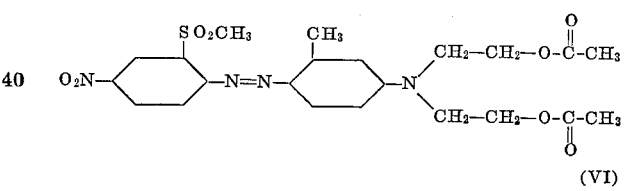

(VI)

may be prepared as follows.

This example is the same as Example 1 above, except that 100 gms. N,N - bis(2 - hydroxyethyl) - m - toluidine [J.A.C.S., 63, pp. 3236–3237 (1941)] is substituted for the 100 gms. 2,2′-(m-chlorophenylimino)diethanol of Example 1 to produce an acetic anhydride solution of N,β,N,β-diacetoxyethyl-m-toluidine; and except that 30.6 gms. of the acetic anhydride solution of N,β,N,β-diacetoxyethyl-m-toluidine is substituted for the 35.2 gms. acetic anhydride solution of N,β,N,β-diacetoxyethyl-m-chloroaniline used in Example 1.

EXAMPLE 3

The dyestuff of the formula

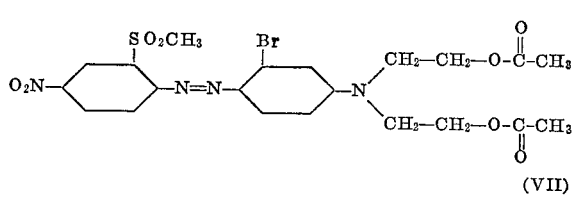

(VII)

may be prepared as follows.

This example is the same as Example 1 above, except that 100 gms. 2,2′-(m-bromophenylimino)diethanol (U.S. Patent No. 2,618,631) is substituted for the 100 gms. 2,2′-(2-chlorophenylimino)diethanol of Example 1 to produce an acetic anhydride solution of N,β,N,β-diacetoxyethyl-m-bromoaniline, and except that 41.2 gms. of the acetic anhydride solution of N,β,N,β-diacetoxyethyl-m-bromoaniline is substituted for the 35.2 gms. acetic anhydride solution of N,β,N,β-diacetoxyethyl-m-chloroaniline used in Example 1.

The following relates to dispersing and applying the dyes of the present invention (Formulas V–VII) to synthetic linear polyester and to comparing these dyeings against similar dyeings made from the dyes of Formulas II and III.

Each of the dyes of Formulas II, III, V, VI and VII above was dispersed by charging into a ball mill 15 parts dried dye, 10.2 parts sodium lignosulfonate, 10.2 parts glycerine and 54 parts water. The compositions were ball milled until the dye particles were substantially uniform and averaged 1–2 microns. Enough water was added to each to bring its final volume to 100 parts, resulting in a 15% aqueous dispersion of each dye.

Light and heavy shades dyeings of each of the dyes of Formulas II, III, V, VI and VII above were made on woven blended 65% polyethylene terephthalate/35% cotton textile fabric samples as follows. The light shades dyeings were made by mixing padding liquors containing 56.8 gms. 15% aqueous dye dispersion, 113.6 gms. sodium alginate migration inhibitor, and enough water to bring to 1 gallon; the fabric was padded through the liquor at room temperature; squeezed with nip rollers to 60% wet pickup based on fabric weight; predried to substantial dryness; the dyes were fixed by exposing the fabric to dry heat in an oven at 415° F. for 90 seconds; whereafter the fabrics were scoured and dried. The heavy shades dyeings were made in similar manner, except that the amounts of 15% aqueous dye dispersion were increased in each instance to 113.6 gms. The cotton portion of the fabric was then dissolved and removed from the fabric by treating the fabric with 70% aqueous $H_2SO_4$, rinsing with water, neutralizing with ammonia and drying.

The dyeings, having only the polyester portion of the fibers remaining, were then subjected to light fastness tests in the Fade-Ometer® carbon arc light fastness tester, No. 3 AATCC wash tests, and sublimation tests and the results are presented in Table A below. Pattern and stain readings are on the Grey Scale in which 5 is optimum.

TABLE A

| Test | Formula II Dye | Formula III Dye | Formula V Dye | Formula VI Dye | Formula VII Dye |
|---|---|---|---|---|---|
| Shade | Dull red | Bordeaux | Red | Rubine | Brick red. |
| Light fastness light shade | More than 60 hours without break. | Slight break at 40 hours. | More than 60 hours without break. | More than 60 hours without break. | More than 60 hours without break. |
| Light fastness heavy shade | do | do | do | do | Do. |
| Wash fastness light shade | Excellent; Pattern 4–5 Stain 5. | Excellent; Pattern 5 Stain 5. | Excellent; Pattern 4–5 Stain 5. | Excellent; Pattern Stain 5. | Excellent; Pattern 5, Stain 5. |
| Wash fastness heavy shade | Very good; Pattern 4 Stain 4–5. | Excellent; Pattern 5, Stain 4–5. | Very good; Pattern 4, Stain 4–5. | do | Do. |
| Sublimation light shade 1 minute 400° F. | Excellent; Stain 5 | Excellent Stain 5 | Excellent; Stain 5 | Excellent; Stain 5 | Excellent; Stain 5. |
| Sublimation heavy shade 1 minute 400° F. | do | Good; Stain 4 | do | Very good; Stain 4–5 | Good; Stain 4. |

The dyes of Formulas II, III, V, VI and VII above were next applied to woven blended textile fabric consisting of 65% polyethylene terephthalate and 35% cotton by the dyeing method described for the dyeings listed in Table A, except that the cotton portion of the fibers were not dissolved, and except that residual surface dye was cleared by immersing the dyeings for 10 minutes in 56.8 gms. NaOH and 56.8 gms. $Na_2S_2O_4$ per gallon of water at 140° F., rinsing with water, soaping, rinsing and drying; 113.6 gms. 15% aqueous dispersions of the dyes were used. Portions of the dyeings were then subjected to the following tests; carbon arc light fastness, No. 3 AATCC wash fastness, sublimation fastness, gas (oxides of nitrogen) fastness, and ozone fastness, and the results are given in Table B below.

Other portions of the cotton/polyester dyeings were reserved and subjected to permanent press resin finishing in the known manner (U.S. Patent No. 2,974,432) using dimethylol dihydroxy ethylene urea resin, and the permanent press finished fabric was then subjected to the tests and observations recorded in Table C below.

TABLE B

| Test | Formula II Dye | Formula III Dye | Formula V Dye | Formula VI Dye | Formula VII Dye |
|---|---|---|---|---|---|
| Shade | Dull red | Bordeaux | Red | Rubine | Brick red. |
| Light fastness | Trace break 40 hours | Trace break 20 hours | More than 60 hours without break. | More than 60 hours without break. | Trace break 40 hours. |
| Wash fastness | Excellent; Pattern 4–5 Stain 5. | Excellent; Pattern 5, Stain 5. | Excellent; Pattern 5, Stain 5. | Excellent; Pattern 5, Stain 5. | Excellent; Pattern 5, Stain 5. |
| Sublimation 1 minute 400° F. | Excellent; Stain 5 | Very good; Stain 4–5 | Excellent; Stain 5 | Very good; Stain 4–5 | Excellent; Stain 5. |
| Gas fastness | Excellent | Excellent | Excellent | Excellent | Excellent. |
| Ozone fastness | do | do | do | do | Do. |

TABLE C

| Test | Formula II Dye | Formula III Dye | Formula V Dye | Formula VI Dye | Formula VII Dye |
|---|---|---|---|---|---|
| Shade | Dull red | Bordeaux | Red | Rubine | Brick red. |
| Shade change on permanent press finishing. | Moderate | Very slight | Very slight | Very slight | Very slight. |
| Light fastness | Break at 20 hours | Break at 20 hours | More than 60 hours without break. | Slight break at 60 hours | Trace break at 20 hours and 40 hours. |
| No. 3 AATCC wash fastness test. | Fair; Pattern 3–4, Stain 3. | Very good; Pattern 4–5, Stain 4. | Excellent; Pattern 5, Stain 5. | Very good; Pattern 4–5, Stain 4. | Very good; Pattern 4–5, Stain 4–5. |
| Sublimation 1 minute at 400° F. | Excellent; Stain 5 | Very good; Stain 4–5 | Excellent; Stain 5 | Very good; Stain 4–5 | Excellent; Stain 5. |
| Gas fastness | Excellent | Excellent | Excellent | Excellent | Excellent. |
| Ozone fastness | do | do | do | do | Do. |

The following tests relate to comparing the shade building power of the dyes of Formulas II, III, V, VI and VII. These dyes were applied to 65% polyethylene terephthalate/35% cotton textile fabric by the conventional long bath carrier dyeing method, using emulsified o-phenylphenol carrier. The amounts of each dye were progressively varied so that dyeings of 0.5%, 1%, 2% and 4% strength were prepared. In this method, the liquor to goods ratio was 30:1 and % relates to weight of 15% dye dispersion (calculated as dispersion) in the dye liquor to weight of fabric.

It was observed that the dyes of Formulas II, III, V, VI and VII built equally well to medium depths of shade, and that all of the dyes, except the dye of Formula II, built to moderately heavy and heavy shades; the dye of Formula II did not build to moderately heavy or heavy depths of shade.

What is claimed is:
1. A water insoluble monoazo dyestuff of the formula

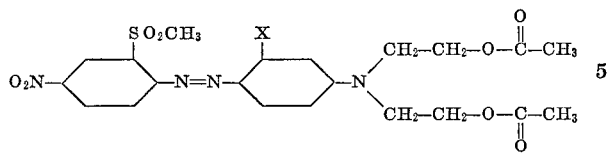

wherein X is Cl, Br or $CH_3$.

2. A dyestuff as defined in claim 1, and further characterized in that X is Cl.
3. A dyestuff as defined in claim 1, and further characterized in that X is Br.
4. A dyestuff as defined in claim 1, and further characterized in that X is $CH_3$.

References Cited

UNITED STATES PATENTS 2,082,156  6/1937  Felix et al. _____ 260—207.5 X

FOREIGN PATENTS 1,047,229  11/1966  Great Britain.

CHARLES B. PARKER, Primary Examiner
CHARLES F. WARREN, Assistant Examiner

U.S. Cl. X.R.

8—41

UNITED STATES PATENT OFFICE
CERTIFICATE OF CORRECTION

Patent No. 3,497,495 February 24, 1970

Duncan G. Carmichael

It is certified that error appears in the above identified patent and that said Letters Patent are hereby corrected as shown below:

Column 2, line 43, "present" should read -- presently --. Column 4, line 73, "(2-chlorophenylimino)diethanol" should read -- (m-chlorophenylimino)diethanol --. Columns 5 and 6, TABLE A, fifth column, line 5 thereof, "Excellent; Pattern" should read -- Excellent; Pattern 5 --.

Signed and sealed this 1st day of December 1970.

(SEAL)
Attest:

Edward M. Fletcher, Jr.
Attesting Officer

WILLIAM E. SCHUYLER, JR.
Commissioner of Patents